United States Patent
Mao et al.

(10) Patent No.: US 12,493,956 B2
(45) Date of Patent: Dec. 9, 2025

(54) METHOD AND SYSTEM OF CALCULATING THE CROSS-SECTION AREA AND INCLUDED ANGLE OF THREE-DIMENSIONAL BLOOD VESSEL BRANCH

(71) Applicant: Chengdu Panovision Technology Co., LTD., Sichuan (CN)

(72) Inventors: Jingqi Mao, Sichuan (CN); Zhao Wang, Sichuan (CN); Xi Chen, Sichuan (CN); Nan Huang, Sichuan (CN)

(73) Assignee: Chengdu Panovision Technology Co., LTD., Sichuan (CN)

( * ) Notice: Subject to any disclaimer, the term of this patent is extended or adjusted under 35 U.S.C. 154(b) by 441 days.

(21) Appl. No.: 18/195,796

(22) Filed: May 10, 2023

(65) Prior Publication Data
US 2024/0070855 A1 Feb. 29, 2024

(51) Int. Cl.
*G06T 7/00* (2017.01)
*G06T 7/62* (2017.01)
(Continued)

(52) U.S. Cl.
CPC .............. *G06T 7/0012* (2013.01); *G06T 7/62* (2017.01); *G06T 19/20* (2013.01); *G06V 10/44* (2022.01);
(Continued)

(58) Field of Classification Search
CPC ......... G06T 7/0012; G06T 7/62; G06T 19/20; G06T 2207/10101; G06T 2207/10132; G06T 2207/20084; G06T 2207/30101; G06T 2219/2016; G06T 7/187; G06T 2207/20081; G06V 10/44; G06V 10/46; G06V 10/82; G06V 20/69; G06V 2201/03; A61B 8/0891; A61B 8/12; A61B 5/0066; A61B 5/0084; A61B 5/72; A61B 8/52; G06N 3/08
See application file for complete search history.

(56) References Cited

U.S. PATENT DOCUMENTS

| | | | | |
|---|---|---|---|---|
| 12,315,076 B1* | 5/2025 | Farkash | ................... | G06T 3/10 |
| 2014/0029816 A1* | 1/2014 | Graham | ................ | G06T 7/0012 |
| | | | | 382/131 |
| 2015/0238121 A1* | 8/2015 | Tu | ..................... | A61B 5/02007 |
| | | | | 600/407 |

* cited by examiner

*Primary Examiner* — Gregory A Morse
*Assistant Examiner* — Ty Mitchell Beatty

(57) ABSTRACT

Provided are method and system of calculating cross-section area and included angle of three-dimensional blood vessel branch, comprising: obtaining the contours of a main blood vessel and a branch blood vessel; determining connecting points of the main blood vessel and the branch blood vessel, a three-dimensional branch outer contour, and an initial normal vector of a branch section; determining the position of the branch section at the branch connecting part and an intersecting cross-section of the branch section and the branch outer contour; rotating the three-dimensional branch cross-section contour to obtain an equivalent two-dimensional branch cross-section contour, and calculating the area of the two-dimensional branch cross-section contour; obtaining branch cross-section areas and corresponding normal vectors thereof; and taking the minimum branch cross-section area as the cross-section area of this segment of branch blood vessel, and determining the included angle between the branch blood vessel and the main blood vessel.

17 Claims, 4 Drawing Sheets

(51) Int. Cl.
  *G06T 19/20* (2011.01)
  *G06V 10/44* (2022.01)
  *G06V 10/46* (2022.01)
(52) U.S. Cl.
  CPC .... *G06V 10/46* (2022.01); *G06T 2207/10101* (2013.01); *G06T 2207/10132* (2013.01); *G06T 2207/20084* (2013.01); *G06T 2207/30101* (2013.01); *G06T 2219/2016* (2013.01)

__

METHOD AND SYSTEM OF CALCULATING THE CROSS-SECTION AREA AND INCLUDED ANGLE OF THREE-DIMENSIONAL BLOOD VESSEL BRANCH

CROSS-REFERENCE TO RELATED APPLICATION

This application claims priority to a Chinese patent application filed in the Patent Office of China on Aug. 24, 2022, with the application number of 2022110213780 and the invention title of "Method and System of Calculating the Cross-Section Area and Included Angle of Three Dimensional Blood Vessel Branch", the entire contents of which are incorporated herein by reference.

TECHNICAL FIELD

The present disclosure relates to the technical field of medical imaging, and a method and a system of calculating a cross-section area and an included angle of a three-dimensional blood vessel branch.

BACKGROUND ART

Coronary heart disease is one of the most important causes of deaths of diseases worldwide, and it is of more important significance to strengthen monitoring and treatment of coronary heart disease with the accelerated trend of social aging. A main cause of coronary heart disease is insufficient blood supply to heart due to stenosis or obstruction of coronary artery blood vessels, therefore, quantification of blood supply capacity of coronary artery blood vessels is required. Branch in a stenotic area of blood vessel is an important factor affecting coronary blood flow rate. The coronary angiography imaging commonly used in clinic at present can display the degree of stenosis of blood vessel, but cannot realize accurate identification of three-dimensional shape of the branch due to projection imaging and low imaging resolution thereof.

Intravenous Ultrasound (IVUS) is a technique in which a catheter is used to guide a high-frequency micro-ultrasound probe into a vascular cavity for imaging, and after rotational scanning in the vascular cavity, fine anatomical information of vascular tissue structure and geometry is displayed by an electronic imaging system. Intravascular optical coherence tomography (OCT) is an intravascular tomographic imaging method rapidly developed in recent years, which, by using light interference, converts detected reflective or scattered signals of biological tissues into electrical signals and reconstructs a biological tissue structure image. Both IVUS and OCT imaging have high spatial resolution, and can accurately identify blood vessel information in the image as well as branch blood vessels extending from the main blood vessel. In the above, IVUS has strong penetrating power and OCT has better resolution, therefore, an integrated image of both IVUS and OCT can render more comprehensive branch geometric information.

At present, researches on branch geometric information based on intravascular imaging mainly focus on automatic identification of branch shape in a two-dimensional image, but quantitative measurement of the branch geometric information for both vascular structure and functional evaluation depends on accurate quantification and reconstruction of branch in the three-dimensional space. For example, the gold standard for evaluating coronary stenosis, that is, fractional flow reservation (FFR) of coronary artery, is affected by the cross-section area of lumen branch in the three-dimensional space. A stent is usually implanted in clinic for radially supporting blocked blood vessel, thus relieving stenosis and restoring coronary artery blood flow. Herein, for implanting stent into a connecting portion of main blood vessel and the branch, it is necessary to directionally locate an included angle of the branch relative to the main blood vessel in the three-dimensional space, so as to realize accurate implantation, and prevent stent malapposition, vessel re-occlusion, and stent thrombosis. In particular, realizing accurate identification and quantification of branch in a two-dimensional image is not equivalent to being capable of obtaining the accurate information of the blood vessel branch in the three-dimensional space, because the three-dimensional space requires additional information such as the angle of the branch relative to the main blood vessel; therefore, it is relatively difficult to automatically, rapidly, and accurately measure the cross-section area of a three-dimensional branch.

It should be noted that the information disclosed in the above part of Background Art is only for enhancement of understanding of the background of the present disclosure, and therefore may include information that does not constitute prior art already known to a person ordinarily skilled in the art.

SUMMARY

The present disclosure, aiming at overcoming the defects of the prior art, provides a method and a system of calculating a cross-section area and an included angle of a three-dimensional blood vessel branch, which solves the problem that the prior art does not support the geometrical quantitative measurement of side branch in the three-dimensional space, and cannot automatically, quickly, and accurately measure the real cross-section area and an included angle of a three-dimensional blood vessel branch.

The objective of the present disclosure is achieved by the following technical solutions: a method of calculating the cross-section area and an included angle of a three-dimensional blood vessel branch, wherein the calculating method includes steps of:

S1, automatically detecting the contours of a main blood vessel and a branch blood vessel according to intravascular imaging data, and determining connecting points of the main blood vessel and the branch blood vessel;

S2, determining a three-dimensional branch outer contour and determining an initial normal vector of a branch section;

S3, translating the branch section to a branch connecting part, and determining a position thereof at the branch connecting part and an intersecting cross-section of the branch section and the branch outer contour;

S4, rotating the three-dimensional branch cross-section contour to obtain an equivalent two-dimensional branch cross-section contour, and calculating an area of the two-dimensional branch cross-section contour;

S5, rotating the normal vector of the branch section, and repeating steps S3 and S4, to obtain a series of branch cross-section areas and normal vectors corresponding thereto; and S6, selecting the minimum branch cross-section area $s_{Min}$ in all the branch cross sections as the cross-section area of this segment of branch blood vessel, and regarding an included angle β between a normal vector corresponding to the minimum branch cross-section area and z axis as the included angle between the branch blood vessel and the main blood vessel.

In step S1, the step of automatically detecting the contours of a main blood vessel and a branch blood vessel according to intravascular imaging data, and determining connecting points of the main blood vessel and the branch blood vessel includes:

exacting high-level semantic features in a blood vessel image through a convolutional neural network, acquiring context information from the high-level semantic features, erasing foreground information by reverse attention so as to identify a specific tissue region, obtaining image frames representing structural details of vessel segmentation boundary, judging whether a branch exists in the current frame, wherein if a branch exists, outputting segmentation results of the main blood vessel and the branch blood vessel respectively, and extracting the contours to obtain a main blood vessel contour $L_1$ and a branch blood vessel contour $L_2$; and acquiring an intersecting segment of the main blood vessel contour $L_1$ and the branch blood vessel contour $L_2$ as a connecting part contour $L_3$, i.e., $L_3=L_1 \cap L_2$, wherein the contour $L_3$ consists of a continuous point set $P=\{p_1, p_2, \ldots, p_i\}$, contour points $p_1$ and $p_i$ at two ends of the point set P are taken as connecting points $Q_1$ and $Q_2$ of the main blood vessel and the branch blood vessel in the current frame, wherein i is the number of point sets P.

In step S2, the step of determining a three-dimensional branch outer contour includes:

obtaining a real two-dimensional blood vessel outer contour $L_{Out}=L_2-L_3$ of each frame where a branch exists, and obtaining a three-dimensional contour $L_V=\Sigma L_{Out}$ by sequentially stacking r sequential frames where the branch exists; and inserting m virtual frames between each real frame, synthesizing and obtaining a branch contour $L_{Vir}$ of each virtual frame by combining the real branch contours $L_{Out}$ in adjacent frames with different influence factors, and obtaining a total branch outer contour $L_{New}=L_V+\Sigma L_{Vir}$ after combining branch contours of the virtual frames.

In step S2, the step of determining an initial normal vector of a branch section includes:

performing a three-dimensional modeling based on the segmentation result of the vessel, and calculating the centroid coordinates of the main blood vessel three-dimensional region $V_1$ and a branch blood vessel three-dimensional region $V_2$, denoted as $M_1$ and $M_2$; and obtaining a vector $\overline{M_1M_2}$ according to $M_1$ and $M_2$ as an initial normal vector $N_{Ori}$ of the branch section, and obtaining a branch initial section $S_{Ori}$ through the centroid $M_1$ of the main blood vessel.

In step S3, the step of translating a branch section to the branch connecting part, and determining a position thereof at the branch connecting part and an intersecting cross-section of the branch section and the branch outer contour includes:

translating the initial section $S_{Ori}$ along the normal vector until it intersects the branch connecting contour $L_C$, wherein the section after the translation is denoted as $S_F$;

herein, the section $S_F$ intersects each frame of the branch outer contour $L_{New}$ in the three-dimensional space, and sequentially arranging all the intersecting points counterclockwise to obtain a three-dimensional branch cross-section contour point set $C_{3d}=\{c_1, c_2, \ldots c_h\}$, wherein h is a number of three-dimensional branch cross-section contour point sets $C_{3d}$.

After obtaining the plurality of branch cross-section contours, screening the plurality of branch cross-section contours according to branch cross-section screening conditions so as to obtain valid branch cross-section contours; and the branch cross-section screening conditions include:

the section $S_F$ and the branch outer contour $L_{New}$ have two intersecting points at the first frame; the section $S_F$ have two intersecting points with the branch outer contour $L_{New}$ at continuous a frames thereafter, a≥2; and there may be only one intersecting point at the last frame of the continuous a frames; and if frame a is not the last frame of this branch segment, all frames of the branch outer contour $L_{New}$ after frame a+1 do not intersect the section $S_F$.

In step S4, the step of rotating a three-dimensional branch cross-section contour to obtain an equivalent two-dimensional branch cross-section contour includes:

for any point c on the three-dimensional branch cross-section contour $C_{3d}$, calculating a perpendicular point $c_K$ thereof on K and an included angle α between the point c and $S_K$, and rotating the point c by the angle α to the plane $S_K$ with the point $c_K$ as the center, so as to obtain a two-dimensional equivalent point c' of the point c; and rotating all points on the three-dimensional branch cross-section contour $C_{3d}$ to the plane $S_K$, so as to obtain an equivalent two-dimensional contour of the three-dimensional branch cross-section contour, denoted as $C_{2d}$.

In step S4, the step of calculating an area of the two-dimensional branch cross-section contour includes:

replacing straight boundaries at the first and last frames with arc contours to obtain a modified two-dimensional contour $C_{Arc}$, and calculating an area of the enclosed contour formed by $C_{Arc}$ using Green formula, i.e. a required branch cross-section contour area $S_{Now}$, wherein height h of the arc contour is related to actual frame interval between each frame and current cross-section angle.

A rotating manner of rotating the initial normal vector of the branch section in step S5 includes rotating by changing the angle in equal proportions or rotating by changing the angle in a sparse-to-dense manner, wherein the intravascular imaging data includes intravascular optical coherence tomography data and intravascular ultrasound data.

A system of calculating a cross-section area and an included angle of a three-dimensional blood vessel branch, wherein it includes an image acquisition module, a blood vessel branch calculation module, a post-processing module, and a display module;

the image acquisition module is configured to acquire OCT images or IVUS images, or simultaneously acquire both the OCT and IVUS images, of the target blood vessel;

the blood vessel branch calculation module is configured to automatically detect the contours of a main blood vessel and a branch blood vessel according to intravascular imaging data, and determine connecting points of the main blood vessel and the branch blood vessel; determine a three-dimensional branch outer contour and determine an initial normal vector of a branch section; translate the branch section to a branch connecting part, and determine a position of the branch section at the branch connecting part and an intersecting cross-section of the branch section and the branch outer contour; rotate a three-dimensional branch cross-section contour to obtain an equivalent two-dimensional branch cross-section contour, and calculate the area of the two-dimensional branch cross-section contour; obtain a series of branch cross-section areas and corresponding normal vectors thereof by rotating the normal vector of the branch section; select the minimum branch cross-section area $s_{Min}$ in all branch cross-sections as the cross-section area of this segment of branch blood vessel, and regard the included angle β between the normal vector corresponding to the minimum branch cross-section area and z axis as the included angle between the branch blood vessel and the main blood vessel;

the post-processing module is configured to perform corresponding post-processing on the calculated branch area and included angle; and the display module is configured to display the detection and calculation results of target blood vessel branch in multiple dimensional display modes.

The present disclosure has the following advantages: the method and the system of calculating a cross-section area and an included angle of a three-dimensional blood vessel branch not only can determine the contours of the main blood vessel and the branch blood vessel in the two-dimensional space, but can also perform three-dimensional branch modeling and accurate quantification thereof, further analyze and calculate to obtain the cross-section area of the branch blood vessel in the three-dimensional space and its included angle with the main blood vessel; and it can guide subsequent quantitative evaluation of vascular morphology and function, for example, FFR calculation, which requires an accurate quantification of the cross-section area of a branch blood vessel in the three-dimensional space to calculate shunt. When implanting a stent in clinic at the connecting part of the main blood vessel and the branch blood vessel, an accurate included angle of the branch blood vessel relative to the main blood vessel in the three-dimensional space is required for directional positioning. The present disclosure promotes the development of three-dimensional quantification technology of vascular branches.

DETAILED DESCRIPTION OF EMBODIMENTS

Figure 1:
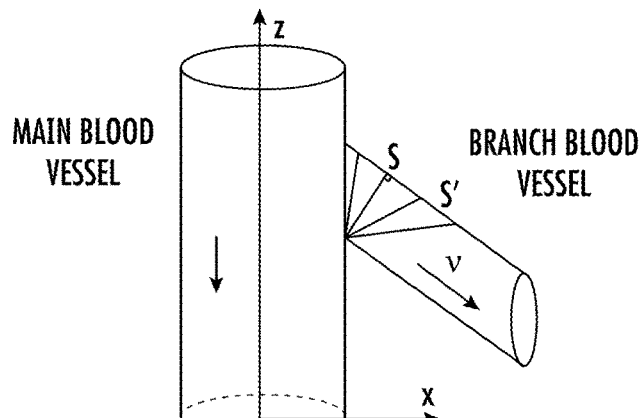
FIG. 1 is a schematic diagram of a connecting part between a main blood vessel and a branch blood vessel based on vascular morphology and hydrodynamic theory.

In order to make the objectives, technical solutions, and advantages of the embodiments of the present disclosure more clear, the technical solutions in the embodiments of the present disclosure will be described below clearly and completely with reference to the drawings in the embodiments of the present disclosure. It is apparent that the embodiments described are some, but not all of the embodiments of the present disclosure. Generally, components in the embodiments of the present disclosure described and shown in the drawings herein may be arranged and designed in various different configurations. Therefore, the detailed description below of the embodiments of the present disclosure provided in the drawings is not intended to limit the scope of the present disclosure claimed, but merely illustrates chosen embodiments of the present disclosure. All of other embodiments obtained by a person skilled in the art based on the embodiments of the present disclosure without using any creative efforts shall fall within the scope of protection of the present disclosure. The present disclosure is further described below with reference to the drawings.

An embodiment of the present disclosure relates to a method of automatically identifying a branch blood vessel and calculating a three-dimensional cross-section area thereof and an included angle between the branch blood vessel and the main blood vessel. The technical problems mainly solved are detecting and obtaining the branch contour through intravascular image data, and calculating a cross-section area of the blood vessel branch and the included angle between the branch blood vessel and the main blood vessel in the three-dimensional space, so as to guide subsequent quantitative evaluation of vascular morphology and function, for example, FFR calculation and stent implantation across the side branch. The present disclosure can not only extract a two-dimensional branch contour and a position thereof, but also perform three-dimensional branch modeling on this basis, and further analyze and calculate to obtain the cross-section area of the branch blood vessel relative to the main blood vessel in the three-dimensional space and relevant three-dimensional contour and included angle thereof, wherein contents specifically included are as follows:

as shown in FIG. 1, based on vascular morphology and hydrodynamic theory, a direction of a branch blood vessel represents a flow direction v when blood flows into a branch, and a cross section of the branch is a plane S perpendicular to the direction of the blood flow and located at a connecting part of the branch and the main blood vessel. A cross section S' intersecting the branch blood vessel is obtained by making a plane in any direction at the branch connecting part, and the plane S is perpendicular to an extension direction of the branch, thus S has an area smaller than that of S'. Therefore, the cross section with the minimum area at the branch connecting part is obtained, i.e., a three-dimensional cross section of the blood vessel branch, wherein the normal direction of this cross section is the direction of the included angle of the branch.

Figure 2:
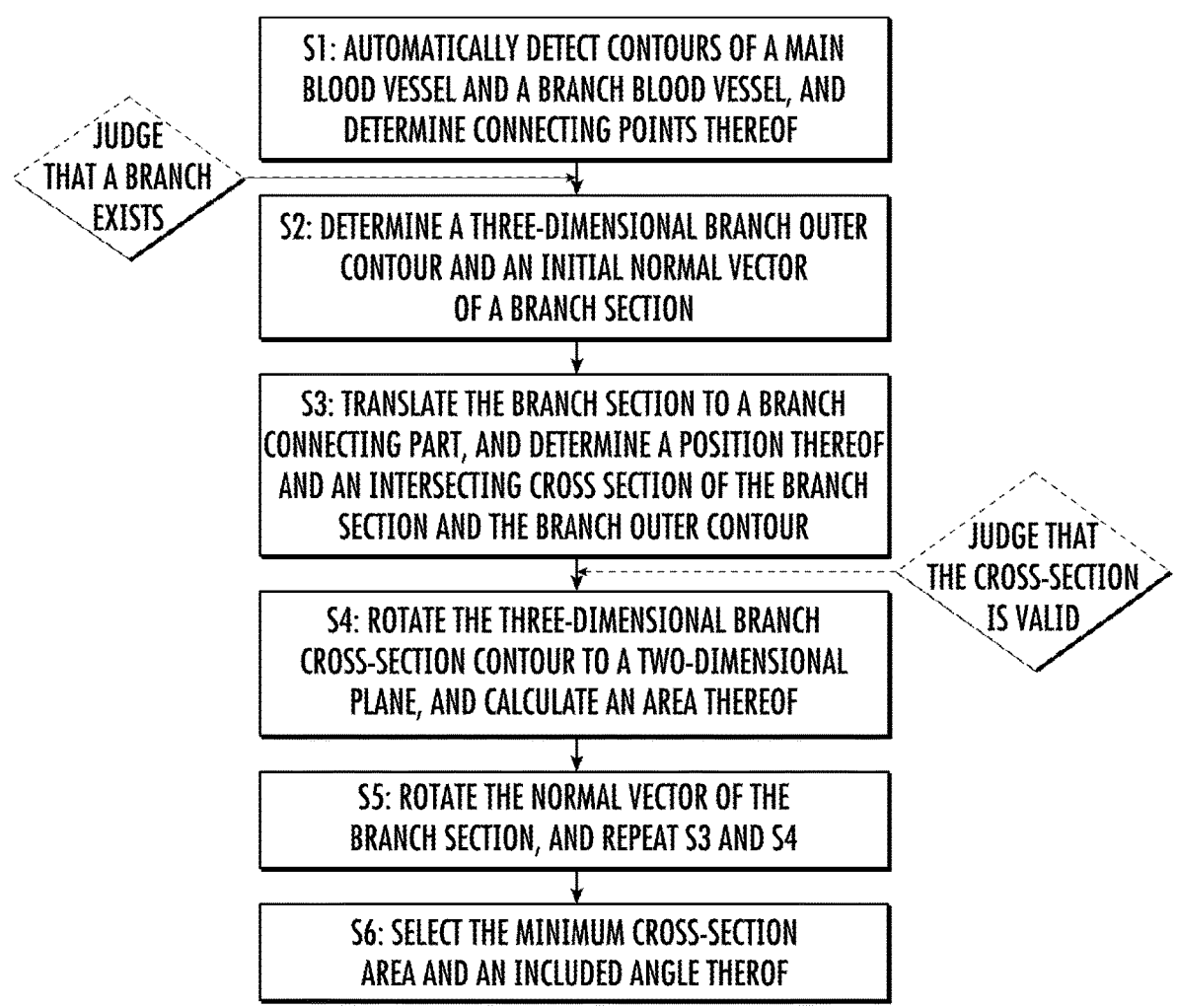
FIG. 2 is a flowchart of automatically identifying a branch blood vessel and calculating a three-dimensional cross-section area thereof and an included angle between the branch blood vessel and the main blood vessel.

A flowchart of calculating and obtaining the above data is shown in FIG. 2, and specific steps implemented are as follows.

Step one, automatically detecting the contours of the main blood vessel and the branch blood vessel according to intravascular imaging data.

Sequential two-dimensional original images in vascular cavity of a patient are obtained using an intravascular imaging system, and sequential stacking of various frames thereof can reflect the anatomical information about the blood vessel of the patient in the three-dimensional space. The three-dimensional space takes positive directions of width and height of each frame of image as positive directions of x axis and y axis, and a stacking direction of the sequentially acquired frames is taken as a positive direction of z axis. Since intravascular imaging is typically based on a pull-back system, a positive direction of blood flow in the main blood vessel is a negative direction of z axis. Based on the large amount of data obtained by the intravascular imaging system, an artificial intelligence algorithm is used for automatically detecting blood vessel and branch contours.

Specifically, a convolutional neural network is selected for algorithm implementation. An encoder and a parallel partial decoder are employed to acquire high-level semantic information in the blood vessel image. A channel-wise feature pyramid module is adopted to acquire contextual information from high-level features. An reverse attention module is employed, to erase foreground information by reverse attention so as to identify a specific tissue region, and obtain structural details of vessel segmentation boundary.

Figure 3:
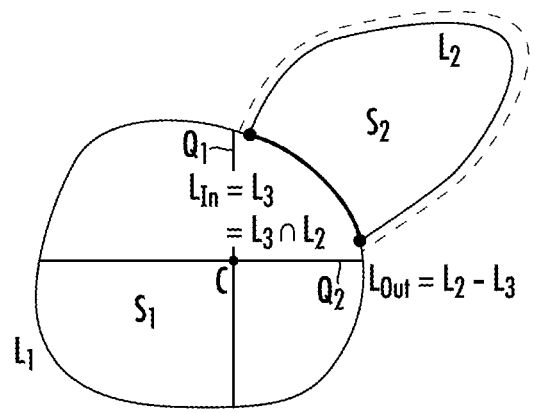
FIG. 3 is a schematic diagram of the contours of the main blood vessel and the branch blood vessel and the connecting part thereof in the two-dimensional space.

It is judged whether the current frame has a branch or not, wherein a main blood vessel segmentation result is directly output for the frame without a branch, and branch analysis is not performed. When it is judged that a branch exists, segmentation results of a main blood vessel and a branch blood vessel are respectively output, as shown in FIG. 3, with the output being kept consistent with dimension of the original image. In the segmentation results, $S_1$ represents a main blood vessel region, $S_2$ represents a branch blood vessel region, and $S_1$ and $S_2$ are exclusive and attached to each other. By further extracting the contours, it is obtained that $L_1$ represents a main blood vessel contour, $L_2$ represents a branch blood vessel contour, and $L_1$ and $L_2$ intersect at the connecting part of the side branch.

Step two, determining the connecting points of the main blood vessel and the branch blood vessel.

As shown in FIG. 3, an intersecting segment of the main blood vessel contour $L_1$ and the branch blood vessel contour $L_2$ is taken, as a connecting part contour $L_3$, i.e., $L_3=L_1 \cap L_2$. The image scale is n*n, and coordinates of a center point C of the image are (n/2, n/2). A central region of intravascular imaging represents the imaging catheter, wherein the main blood vessel contour is a closed curve around the outside of the catheter, and the branch contour is outside the main blood vessel contour. With the center point C of the image as a reference point, counterclockwise rotation is a positive direction, and the contour $L_3$ consists of a continuous point set $P=\{p_1, p_2, \ldots, p_i\}$. In the above, contour points $p_1$ and $p_i$ at two ends of the point set P are taken as connecting points $Q_1$ and $Q_2$ of the main blood vessel and the branch blood vessel in the current frame.

Step three, determining a three-dimensional branch outer contour.

Figure 4:
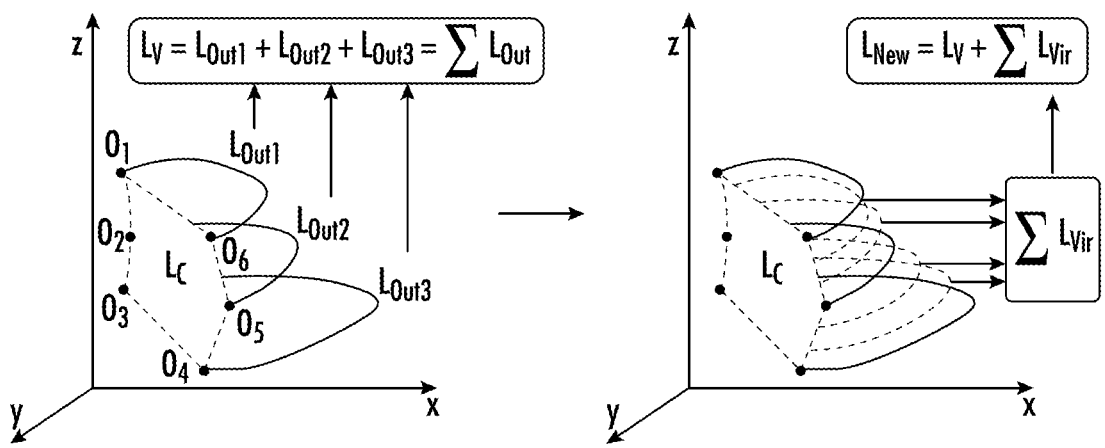
FIG. 4 is a schematic diagram of an outer contour of the branch after three-dimensional modeling.

As shown in FIG. 3, the branch connecting points $Q_1$ and $Q_2$ obtained above can divide the branch contour $L_2$ into two parts, where $L_{In}$ is a virtual contour obtained during imaging segmentation, $L_{Out}$ is a real blood vessel branch outer contour, and can be obtained as $L_{Out}=L_2-L_3$. r frames where the branch exists are sequentially stacked to obtain a real branch outer contour $L_V$ in the three-dimensional space formed by $L_{Out}$ of each frame. As shown in FIG. 4, it is an example of r=3, and $L_V=\Sigma L_{Out}$. Herein, the connecting points $Q_1$ and $Q_2$ of each frame of this branch segment are represented in the three-dimensional space, and various points are sequentially rearranged in a counterclockwise direction to obtain a point set Open=$\{o_1, o_2, \ldots o_k\}$, i.e., a connecting contour $L_C$ of the main blood vessel and the branch blood vessel in the three-dimensional space.

Restricted by the pull-back parameters of the intravascular imaging system, the total number of frames of a branch part is usually sparse and the contours of the side branch in the adjacent frames may change abruptly, and virtual frames may be inserted between the real frames to smooth the contours, so as to buffer the amplitude of the sudden change. m virtual frames are inserted between each frame, and each virtual frame branch contour $L_{Vir}$ is synthesized by combining the real branch contour $L_{Out}$ in the adjacent frames with different influence factors, respectively, wherein the influence factors, changing along with positions of the virtual frames, may linearly change or nonlinearly change. A total branch outer contour after inserting the virtual contours is denoted as $L_{New}$, as shown in FIG. 4, being an example with m=2, wherein $L_{New}=L_V+\Sigma L_{Vir}$.

Step four, determining an initial normal vector of a branch section.

Figure 5:
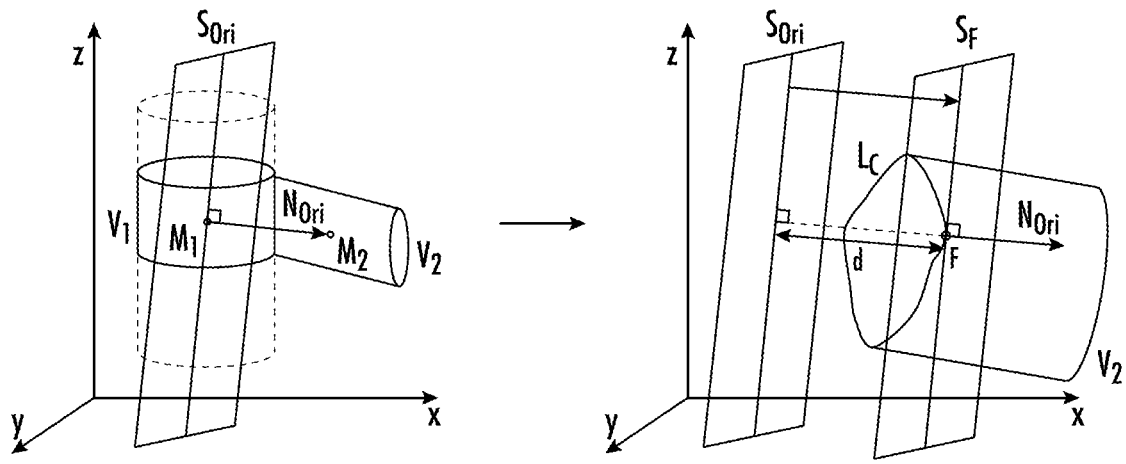
FIG. 5 is a schematic diagram of determining an initial branch section and translating the section to the connecting part of the branch in the three-dimensional space.

As shown in FIG. 5, a three-dimensional modeling is performed based on a sequence segmentation result, to obtain a main blood vessel three-dimensional region $V_1$ and a branch blood vessel three-dimensional region $V_2$, respectively. Centroid coordinates of $V_1$ and $V_2$ are respectively calculated, denoted as $M_1$ and $M_2$. A vector $\overline{M_1M_2}$ is taken as an initial normal vector $N_{Ori}$ of the branch section, and a branch initial section $S_{Ori}$ through the centroid $M_1$ of the main blood vessel is obtained.

Step five, determining a position of the above section translated to the branch connecting part.

As shown in FIG. 5, the initial section $S_{Ori}$ is translated along the direction of the normal vector until it intersects the branch connecting contour $L_C$. First, the Euclidean distance of each point on the branch connecting contour $L_C$ to the initial section $S_{Ori}$ is calculated, so as to obtain the farthest distance d and a current contour point F. $S_{Ori}$ is translated by a distance d along the direction of $N_{Ori}$ so as to make it intersect $L_C$ at the contour point F, wherein the plane after the translation is the three-dimensional branch cross section with $N_{Ori}$ as the normal vector direction, denoted as $S_F$.

Step six, determining an intersecting cross section of the above section and the branch outer contour.

Figure 6:
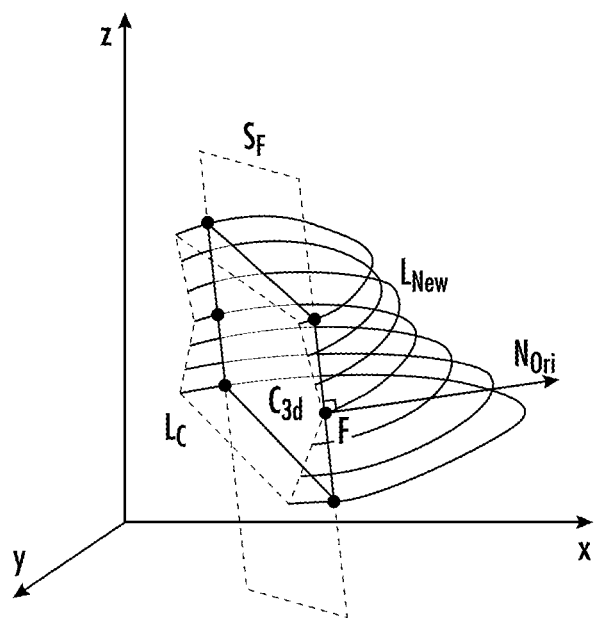
FIG. 6 is a schematic diagram of an intersection cross-section contour between the branch outer contour and the branch section in the three-dimensional space.

The branch outer contour $L_{New}$ consists of r real frames and m virtual frames inserted between each frame, the section $S_F$ intersects each frame of the branch outer contour $L_{New}$ at two points in the three-dimensional space, and all the above intersecting points are sequentially arranged counterclockwise to obtain a point set $C_{3d}=\{c_1, c_2, \ldots c_n\}$, which is a branch cross-section contour. As shown in FIG. 6, it is an example with r=3 and m=2.

However, the direction and position of the section $S_F$ determine the intersection situation with each frame of $L_{New}$, and not all sections $S_F$ can have two intersecting points with each frame of $L_{New}$. If frames are arranged along the positive direction of z axis and the direction of blood flow is along the negative direction of z axis, an effective branch cross-section contour necessarily satisfies that the sections $S_F$ and $L_{New}$ have two intersecting points at the first frame, then $S_F$ and $L_{New}$ have two intersecting points in continuous a frames, where a≥2, and the last frame of the continuous a frames may have only one intersecting point. If frame a is not the last frame of this branch segment, $L_{New}$ does not intersect the section $S_F$ at any frames after frame a+1. There are many cases of the branch cross-section contours that do not satisfy the above valid conditions, all of which are considered as invalid contours and need to be excluded.

Step seven, rotating a three-dimensional branch cross-section contour to obtain an equivalent two-dimensional contour.

Figure 7:
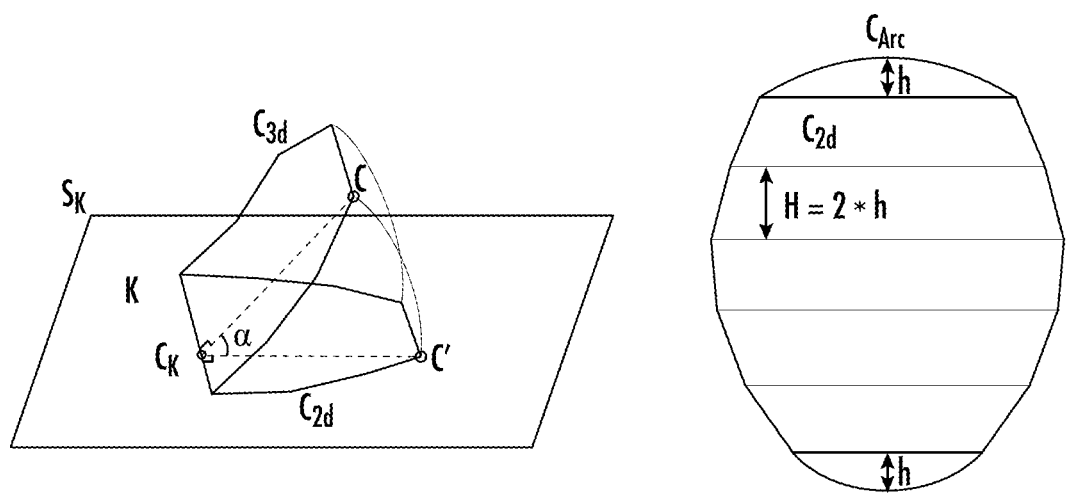
FIG. 7 is a schematic diagram of rotating a three-dimensional cross-section contour to a two-dimensional plane and performing a contour adjustment.

An area is further calculated after valid contour condition is satisfied, wherein the calculation in the three-dimensional space has high computational complexity, therefore, the three-dimensional cross-section contour can be rotated to a two-dimensional plane to obtain an equivalent two-dimensional contour thereof, and then the area is calculated. As shown in FIG. 7, taking an intersection contour line K of the first frame as a reference, a plane $S_K$ parallel to a coordinate plane XOY is made, and taken as a plane where the equivalent two-dimensional contour is located. For any point c on the three-dimensional contour $C_{3d}$, a perpendicular point $c_K$ thereof on K and an included angle $\alpha$ between the point c and $S_K$ are calculated. The point c is rotated by the angle $\alpha$ to the plane $S_K$ with the point $c_K$ as the center to obtain a two-dimensional equivalent point c' of this point. By rotating all points on the three-dimensional contour $C_{3d}$ to the plane $S_K$, an equivalent two-dimensional contour of the three-dimensional branch cross-section contour is obtained, denoted as $C_{2d}$.

Step eight, calculating the area of the above two-dimensional branch cross-section contour.

As shown in FIG. 7, the branch cross-section contour obtained by the above method at the first and last frames is in the form of straight boundaries, but the actual branch cross-section contour as a whole is in the form of a curved boundary. This is because the pull-back speed of the intravascular imaging system is relatively high that it cannot guarantee that the obtained side branch contour is complete. Generally, the start position of the branch contour is between the first frame where the branch can be automatically detected and the previous frame thereof, and the end position is in the same case. Therefore, in order to further restore the actual branch cross-section contour, arc contours need to be supplemented respectively at two ends to replace the straight boundaries, thus obtaining a modified two-dimensional contour $C_{Arc}$.

Height h of the arc is linearly or non-linearly related to the actual frame interval H between each frame and current cross-section angle. Simply, only taking frame interval H into account, the height h can be determined as h=H/2. The area of an enclosed contour formed by $C_{Arc}$ is calculated using Green formula, i.e. denoted as branch cross-section contour area $S_{Now}$.

Step nine, rotating the normal vector of the branch section, and repeating step five to step eight, so as to obtain a series of branch cross-section areas and normal vectors corresponding thereto. When rotating the branch section, the angles can be changed respectively in equal proportions in various directions in the three-dimensional space for rotation, or the angles can be changed in a sparse-to-dense manner, thus saving computational resources.

Step ten, selecting a minimum cross-section area $s_{Min}$ therein as the cross-section area of this segment of branch blood vessel, and taking an included angle $\beta$ between the normal vector of the section and z axis as an included angle between the branch blood vessel and the main blood vessel.

Another embodiment of the present disclosure relates to a system for calculating a cross-section area of a blood vessel branch in the three-dimensional space and an included angle between a branch blood vessel and a main blood vessel based on intravascular imaging information, wherein the system includes an image acquisition module, a blood vessel branch calculation module, a post-processing module, and a display module;

the image acquisition module is configured to acquire OCT images or IVUS images, or to acquire both the OCT and IVUS images, of the target blood vessel;

the blood vessel branch calculation module is configured to automatically detect the contours of a main blood vessel and a branch blood vessel according to intravascular imaging data, and determine connecting points of the main blood vessel and the branch blood vessel; determine a three-dimensional branch outer contour and determine an initial normal vector of a branch section; translate the branch section to a branch connecting part, and determine a position of the branch section at the branch connecting part and an intersecting cross-section of the branch section and the branch outer contour; rotate a three-dimensional branch cross-section contour to obtain an equivalent two-dimensional branch cross-section contour, and calculate the area of the two-dimensional branch cross-section contour; obtain a series of branch cross-section areas and corresponding normal vectors thereof by rotating the normal vector of the branch section; select the minimum branch cross-section area $s_{Min}$ in all branch cross-sections as the cross-section area of this segment of branch blood vessel, and regard an included angle $\beta$ between a normal vector corresponding to the minimum branch cross-section area and the z axis as the included angle between the branch blood vessel and the main blood vessel.

the post-processing module is configured to perform corresponding post-processing on the calculated branch area and included angle;

in the above, the post-processing includes, but is not limited to, calculating FFR, automatic identification and classification of atherosclerotic plaque, target blood vessel hemodynamic simulation and emulation (e.g. calculation of blood vessel wall shear force), virtual stent implantation, surgical planning, management and treatment of bifurcation lesions, etc.; FFR is the ratio of the maximum blood flow that the myocardium can obtain in stenotic area after coronary artery stenosis to the maximum blood flow that the myocardium theoretically can obtain in normal conditions without stenosis;

the display module is configured to display target blood vessel branch detection and calculation results together with OCT or IVUS or coronary angiography image information on a display end in a one-dimensional, two-dimensional, or three-dimensional manner; and a user can observe the branch part in the three-dimensional space through a software interface, and perform surgery planning in real time.

The above-mentioned are merely preferred embodiments of the present disclosure, and it should be understood that the present disclosure is not restricted to the form disclosed herein, and should not be regarded as excluding other embodiments, but may be used in various other combinations, modifications, and environments. In addition, the present disclosure can be altered through the above descriptions or technologies or knowledge in related fields within a scope of concept described herein. All alterations and changes made by a person in the art, without departing from the spirit and scope of the present disclosure, should be within the scope of protection of the claims attached to the present disclosure.

What is claimed is:

1. A method of calculating a cross-section area and an included angle of a three-dimensional blood vessel branch, comprising steps of:
    S1, automatically detecting contours of a main blood vessel and a branch blood vessel according to intravascular imaging data, and determining the connecting points of the main blood vessel and the branch blood vessel;
    S2, determining a three-dimensional branch outer contour and an initial normal vector of a branch section;
    S3, translating the branch section to a branch connecting part, and determining a position thereof at the branch connecting part and an intersecting cross-section of the branch section and the branch outer contour;
    S4, rotating a three-dimensional branch cross-section contour to obtain an equivalent two-dimensional branch cross-section contour, and calculating the area of the two-dimensional branch cross-section contour;
    S5, rotating the normal vector of the branch section, and repeating steps S3 and S4, to obtain a series of branch cross-section areas and normal vectors corresponding thereto; and
    S6, selecting the minimum branch cross-section area $s_{Min}$ of all the branch cross sections as the cross-section area of this segment of branch blood vessel, and regarding an included angle β between a normal vector corresponding to the minimum branch cross-section area and z axis as an included angle between the branch blood vessel and the main blood vessel.

2. The method of calculating a cross-section area and an included angle of a three-dimensional blood vessel branch according to claim 1, wherein in the step S1, the step of automatically detecting the contours of a main blood vessel and a branch blood vessel according to intravascular imaging data, and determining connecting points of the main blood vessel and the branch blood vessel comprises:
    extracting high-level semantic features from a blood vessel image through a convolutional neural network, acquiring contextual information from the high-level semantic features, erasing foreground information by reverse attention so as to identify a specific tissue region, obtaining image frames representing structural details of vessel boundary, and judging whether a branch exists in the current frame, wherein if the branch exists, outputting segmentation results of the main blood vessel and the branch blood vessel respectively, and extracting the contours to obtain a main blood vessel contour $L_1$ and a branch blood vessel contour $L_2$; and
    acquiring an intersecting segment of the main blood vessel contour $L_1$ and the branch blood vessel contour $L_2$ as a connecting part contour $L_3$, i.e., $L_3=L_1 \cap L_2$, wherein the contour $L_3$ consists of a continuous point set $P=\{p_1, p_2, \ldots, p_i\}$, and contour points $p_1$ and $p_i$ at two ends of the point set P are taken as connecting points $Q_1$ and $Q_2$ of the main blood vessel and the branch blood vessel in the current frame, wherein i is the number of point sets P.

3. The method of calculating a cross-section area and an included angle of a three-dimensional blood vessel branch according to claim 2, wherein in the step S2, the step of determining a three-dimensional branch outer contour comprises:
    obtaining a real two-dimensional blood vessel outer contour $L_{Out}=L_2-L_3$ of each frame from r sequential frames where the branch exists, and obtaining a three-dimensional contour $L_V=\Sigma L_{Out}$ by sequentially stacking the frames where the branch is present; and
    inserting m virtual frames between each real frame, synthesizing and obtaining a branch contour $L_{Vir}$ of each virtual frame by combining the real branch contours $L_{Out}$ in adjacent frames with different influence factors, and obtaining a total branch outer contour $L_{New}=L_V+\Sigma L_{Vir}$ after inserting the branch contours of the virtual frames.

4. The method of calculating a cross-section area and an included angle of a three-dimensional blood vessel branch according to claim 1, wherein in the step S2, the step of determining an initial normal vector of a branch section comprises:
    performing a three-dimensional modeling based on the segmentation result of the image sequence, and calculating the centroid coordinates of the main blood vessel three-dimensional region $V_1$ and a branch blood vessel three-dimensional region $V_2$, denoted as $M_1$ and $M_2$; and
    obtaining a vector $\overline{M_1M_2}$ according to $M_1$ and $M_2$, and taking $\overline{M_1M_2}$ as an initial normal vector $N_{Ori}$ of the branch section, and obtaining a branch initial section $S_{Ori}$ through the centroid $M_1$ of the main blood vessel.

5. The method of calculating a cross-section area and an included angle of a three-dimensional blood vessel branch according to claim 4, wherein in the step S3, the step of translating a branch section to the branch connecting part, and determining a position thereof at the branch connecting part and an intersecting cross-section of the branch section and the branch outer contour comprises:
    translating the initial section $S_{Ori}$ along the normal vector until it intersects the branch connecting contour $L_C$, wherein the section after the translation is denoted as $S_F$,
    wherein the section $S_F$ intersects each frame of the branch outer contour $L_{New}$ in the three-dimensional space, and all the intersecting points are sequentially arranged counterclockwise to obtain a three-dimensional branch cross-section contour point set $C_{3d}=\{c_1, c_2, \ldots c_h\}$, wherein h is the number of three-dimensional branch cross-section contour point sets $C_{3d}$.

6. The method of calculating a cross-section area and an included angle of a three-dimensional blood vessel branch according to claim 5, wherein after obtaining the plurality of branch cross-section contours, screening the plurality of branch cross-section contours according to branch cross-section screening conditions to obtain valid branch cross-section contours, wherein the branch cross-section screening conditions comprise:
    the section $S_F$ and the branch outer contour $L_{New}$ have two intersecting points at the first frames; the section $S_F$ and the branch outer contour $L_{New}$ have two intersecting points at each frame of continuous a frames thereafter, where a≥2; and the section $S_F$ and the branch outer contour $L_{New}$ may have only one intersecting point at the last frame of the continuous a frames; and
    if frame a is not the last frame of segment of this branch, the branch outer contour $L_{New}$ does not intersect the section $S_F$ at any frames after frame a+1.

7. The method of calculating a cross-section area and an included angle of a three-dimensional blood vessel branch according to claim 1, wherein in the step S4, the step of rotating a three-dimensional branch cross-section contour to obtain an equivalent two-dimensional branch cross-section contour comprises:

for any point c on a three-dimensional branch cross-section contour $C_{3d}$, calculating a perpendicular point $c_K$ thereof on K and an included angle α between the point c and a plane $S_K$, and rotating the point c by the angle α to the plane $S_K$ with the point $c_K$ as the center, so as to obtain a two-dimensional equivalent point c' of the point c; and rotating all points on the three-dimensional branch cross-section contour $C_{3d}$ to the plane $S_K$, so as to obtain an equivalent two-dimensional contour of the three-dimensional branch cross-section contour, denoted as $C_{2d}$.

8. The method of calculating a cross-section area and an included angle of a three-dimensional blood vessel branch according to claim 1, wherein in the step S4, the step of calculating an area of the two-dimensional branch cross-section contour comprises:

replacing the straight boundaries of the side branch at the start and the end frames with arc contours to obtain a modified two-dimensional contour $C_{Arc}$, and calculating, using Green formula, an area of the enclosed contour formed by $C_{Arc}$, i.e. a required branch cross-section contour area $S_{Now}$, wherein the height h of the arc contour is linearly or non-linearly related to the actual frame interval H between each frame and current cross-section angle.

9. The method of calculating a cross-section area and an included angle of a three-dimensional blood vessel branch according to claim 1, wherein a rotating manner of rotating the initial normal vector of the branch section in the step S5 comprises rotating by changing angles in equal proportions or rotating by changing the angles in a sparse-to-dense manner, wherein the intravascular imaging data comprises intravascular optical coherence tomography data and intravascular ultrasound data.

10. A system of calculating a cross-section area and an included angle of a three-dimensional blood vessel branch, comprising an image acquisition module, a blood vessel branch calculation module, a post-processing module, and a display module, wherein the image acquisition module is configured to acquire OCT images or IVUS images, or acquire both the OCT and IVUS images, of a target blood vessel;

the blood vessel branch calculation module is configured to automatically detect the contours of a main blood vessel and a branch blood vessel according to intravascular imaging data; determine connecting points of the main blood vessel and the branch blood vessel; determine a three-dimensional branch outer contour and determine an initial normal vector of a branch section; translate the branch section to a branch connecting part, and determine a position of the branch section at the branch connecting part and an intersecting cross section of the branch section and the branch outer contour; rotate a three-dimensional branch cross-section contour to obtain an equivalent two-dimensional branch cross-section contour, and calculate the area of the two-dimensional branch cross-section contour; obtain a series of branch cross-section areas and corresponding normal vectors thereof by rotating the normal vector of the branch section; and select the minimum branch cross-section area $s_{Min}$ of all branch cross-sections as the cross-section area of this segment of branch blood vessel, and regard an included angle β between a normal vector corresponding to the minimum branch cross-section area and z axis as the included angle between the branch blood vessel and the main blood vessel;

the post-processing module is configured to perform corresponding post-processing on the calculated branch area and included angle; and the display module is configured to display the detection and calculation results of a target blood vessel branch in multiple dimensional display modes.

11. The method of calculating a cross-section area and an included angle of a three-dimensional blood vessel branch according to claim 2, wherein a rotating manner of rotating the initial normal vector of the branch section in the step S5 comprises rotating by changing angles in equal proportions or rotating by changing the angles in a sparse-to-dense manner, wherein the intravascular imaging data comprises intravascular optical coherence tomography data and intravascular ultrasound data.

12. The method of calculating a cross-section area and an included angle of a three-dimensional blood vessel branch according to claim 3, wherein a rotating manner of rotating the initial normal vector of the branch section in the step S5 comprises rotating by changing angles in equal proportions or rotating by changing the angles in a sparse-to-dense manner, wherein the intravascular imaging data comprises intravascular optical coherence tomography data and intravascular ultrasound data.

13. The method of calculating a cross-section area and an included angle of a three-dimensional blood vessel branch according to claim 4, wherein a rotating manner of rotating the initial normal vector of the branch section in the step S5 comprises rotating by changing angles in equal proportions or rotating by changing the angles in a sparse-to-dense manner, wherein the intravascular imaging data comprises intravascular optical coherence tomography data and intravascular ultrasound data.

14. The method of calculating a cross-section area and an included angle of a three-dimensional blood vessel branch according to claim 5, wherein a rotating manner of rotating the initial normal vector of the branch section in the step S5 comprises rotating by changing angles in equal proportions or rotating by changing the angles in a sparse-to-dense manner, wherein the intravascular imaging data comprises intravascular optical coherence tomography data and intravascular ultrasound data.

15. The method of calculating a cross-section area and an included angle of a three-dimensional blood vessel branch according to claim 6, wherein a rotating manner of rotating the initial normal vector of the branch section in the step S5 comprises rotating by changing angles in equal proportions or rotating by changing the angles in a sparse-to-dense manner, wherein the intravascular imaging data comprises intravascular optical coherence tomography data and intravascular ultrasound data.

16. The method of calculating a cross-section area and an included angle of a three-dimensional blood vessel branch according to claim 7, wherein a rotating manner of rotating the initial normal vector of the branch section in the step S5 comprises rotating by changing angles in equal proportions or rotating by changing the angles in a sparse-to-dense manner, wherein the intravascular imaging data comprises intravascular optical coherence tomography data and intravascular ultrasound data.

17. The method of calculating a cross-section area and an included angle of a three-dimensional blood vessel branch according to claim 8, wherein a rotating manner of rotating the initial normal vector of the branch section in the step S5 comprises rotating by changing angles in equal proportions or rotating by changing the angles in a sparse-to-dense manner, wherein the intravascular imaging data comprises intravascular optical coherence tomography data and intravascular ultrasound data.

* * * * *